(12) United States Patent
Wang et al.

(10) Patent No.: US 9,995,025 B2
(45) Date of Patent: Jun. 12, 2018

(54) FAUCET WITH SENSING ACTIVATION FOR BLOW-DRYING AND DISCHARGE OF WATER AND LIQUID SOAP

(71) Applicant: Xiamen Runner Industrial Corporation, Xiamen (CN)

(72) Inventors: Jun-Sheng Wang, Xiamen (CN); Xi-Min Chen, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 5 days.

(21) Appl. No.: 15/192,289

(22) Filed: Jun. 24, 2016

(65) Prior Publication Data

US 2017/0022692 A1   Jan. 26, 2017

(30) Foreign Application Priority Data

Jul. 23, 2015   (CN) ..................... 2015 2 0538562 U

(51) Int. Cl.
| | |
|---|---|
| *E03C 1/00* | (2006.01) |
| *E03C 1/05* | (2006.01) |
| *G05D 7/06* | (2006.01) |
| *A47K 5/12* | (2006.01) |
| *A47K 10/48* | (2006.01) |
| *E03C 1/04* | (2006.01) |
| *E03C 1/046* | (2006.01) |

(52) U.S. Cl.
CPC ............ *E03C 1/057* (2013.01); *A47K 5/1217* (2013.01); *A47K 10/48* (2013.01); *E03C 1/0404* (2013.01); *G05D 7/0629* (2013.01); *A47K 2005/1218* (2013.01); *E03C 1/046* (2013.01)

(58) Field of Classification Search
CPC .................................................. G05D 23/1393
USPC .............................................................. 4/668
See application file for complete search history.

(56) References Cited

U.S. PATENT DOCUMENTS

| | | | | |
|---|---|---|---|---|
| 4,945,943 A | * | 8/1990 | Cogger | G05D 23/1393 137/360 |
| 7,243,379 B2 | * | 7/2007 | Panopoulos | E04H 4/1654 4/490 |
| 8,028,355 B2 | * | 10/2011 | Reeder | A46B 7/04 4/623 |
| 2009/0293190 A1 | * | 12/2009 | Ringelstetter | E03C 1/057 4/605 |
| 2012/0017367 A1 | * | 1/2012 | Reeder | E03C 1/057 4/597 |
| 2015/0259890 A1 | * | 9/2015 | Shirai | E03C 1/057 4/668 |

* cited by examiner

*Primary Examiner* — Lori Baker
(74) *Attorney, Agent, or Firm* — Chun-Ming Shih

(57) ABSTRACT

A faucet with sensing activation for blow-drying and discharge of water and liquid soap includes a main body and at least one outlet arm mounted on the main body. The at least one outlet arm has a soap outlet, a water outlet and an air outlet correspondingly mounted thereon, and multiple sensors are mounted on the faucet and are electrically connected with multiple controller for activating the soap outlet, the water outlet and the air outlet to discharge liquid soap and water and blow air. As discharge of water and liquid and blow drying are equipped on the same faucet, the space required for mounting the faucet, mounting holes through the sink and assembly works can be reduced.

10 Claims, 6 Drawing Sheets

FAUCET WITH SENSING ACTIVATION FOR BLOW-DRYING AND DISCHARGE OF WATER AND LIQUID SOAP

BACKGROUND OF THE INVENTION

Field of the Invention

The present invention relates a faucet and, more particularly, to a faucet with sensing activation for air blowing and discharge of water and liquid soap.

Description of the Related Art

Hand-washing is a pretty common hygiene practice in daily life. When we wash our hands, the first step is to squeeze soap into the hands from a soap dispenser, the second step is to rub our hands palm to palm and open the faucet to rinse the hands, and last step is to blow dry the hands with a hand dryer. Those hand-washing procedures are too many and complicated, making them inconvenient for hand-washing.

SUMMARY OF THE INVENTION

In view of the problems and drawbacks of the conventional techniques, the objective of the present invention is to provide a faucet with sensing activation for blow-drying and discharge of water and soap, featuring a simple faucet structure for outputting liquid soap, water and air and less room required for mounting the faucet.

To achieve the foregoing objective, the faucet includes a main body and at least one outlet arm.

The at least one outlet arm is mounted on and extends outwards from the main body, and has a soap outlet, a water outlet, an air outlet and multiple sensors respectively mounted on the at least one outlet arm. When an external object approaches one of the soap outlet, the water outlet and the air outlet, the external object is detected by a corresponding sensor for activating one of blow-drying, discharge of water and discharge of liquid soap through a corresponding one of the soap outlet, the water outlet and the air outlet.

Preferably, the at least one outlet arm includes an outlet arm, and the water outlet, the soap outlet, and the air outlet are mounted on the outlet arm.

Preferably, the at least one outlet arm includes a first outlet arm and a second outlet arm, two of the soap outlet, the water outlet and the air outlet are mounted on the first outlet arm, and the remaining one is mounted on the second outlet arm.

Preferably, the at least one outlet arm includes a first outlet arm, a second outlet arm and a third outlet arm, and the soap outlet, the water outlet and the air outlet respectively mounted on the first outlet arm, the second outlet arm and the third outlet arm.

Preferably, the at least one outlet arm is rotatably mounted on the main body.

Preferably, the multiple sensors are photoelectric sensors and are electrically connected with multiple controllers for respectively controlling the soap outlet, the water outlet and the air outlet to discharge liquid soap and water and blow air.

Preferably, the multiple sensors are mounted beside the soap outlet, the water outlet and the air outlet.

Preferably, the multiple sensors are mounted on the main body.

According to the foregoing description, the at least one outlet arm is mounted on the main body, and the soap outlet, the water outlet, the air outlet and the multiple sensors are mounted on the at least one outlet arm. When approaching one of the at least one outlet arm, a user's hand can be detected by a corresponding sensor to activate the corresponding one of the soap outlet, the water outlet and the air outlet to discharge liquid soap, discharge water or blow air upon the hand washing.

The advantages of the automatic faucet with three outlet reside in install space, to avoid has multiple install hole on a wash stand, and convenient for user washing hands.

BRIEF DESCRIPTION OF THE DRAWINGS

The detailed description of the drawings particularly refers to the accompanying figures in which.

DETAILED DESCRIPTION OF THE INVENTION

The purpose, construction, features, functions and advantages of the present invention can be appreciated and understood more thoroughly through the following detailed description with reference to the attached drawings.

Figure 1:
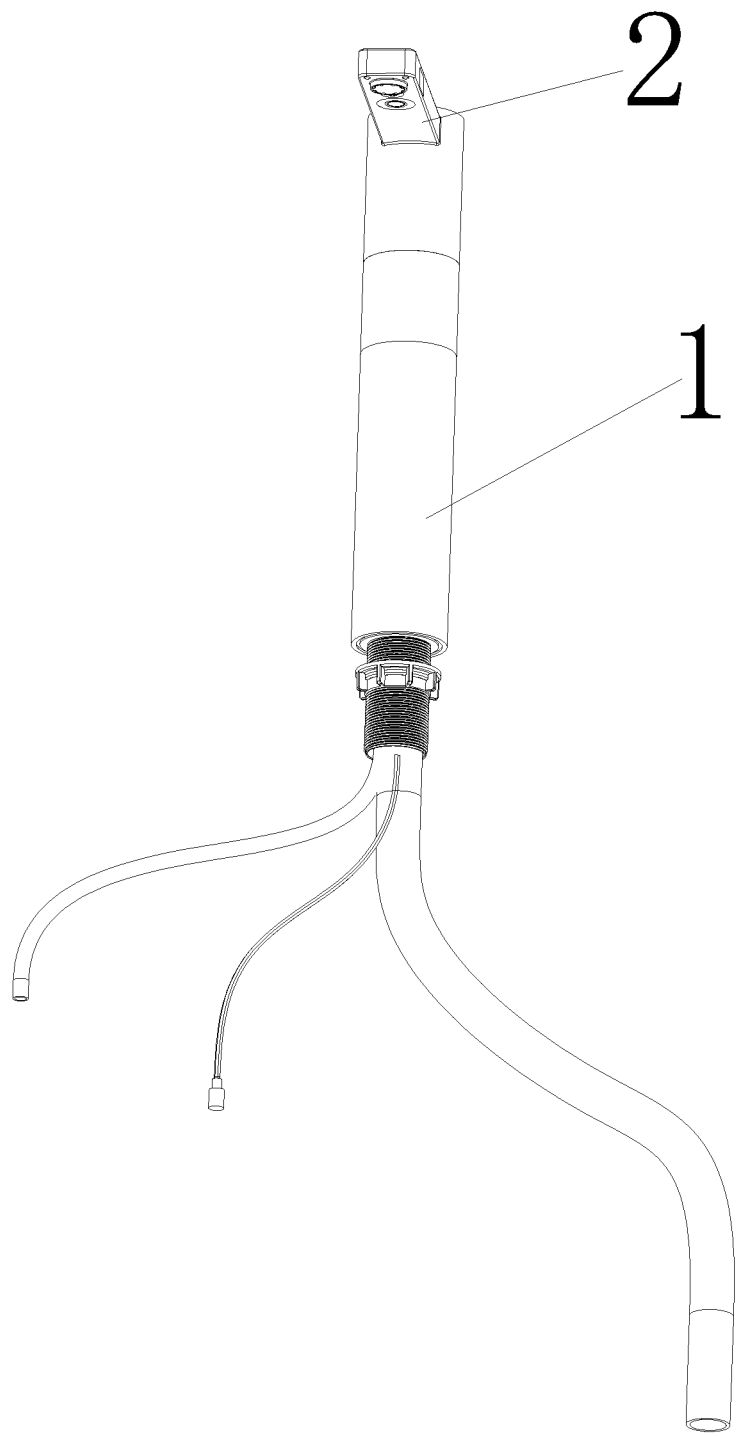
FIG. 1 is a perspective view a first embodiment of a faucet with sensing activation for blow-drying and discharge of water and liquid soap in accordance with the present invention.
Figure 2:
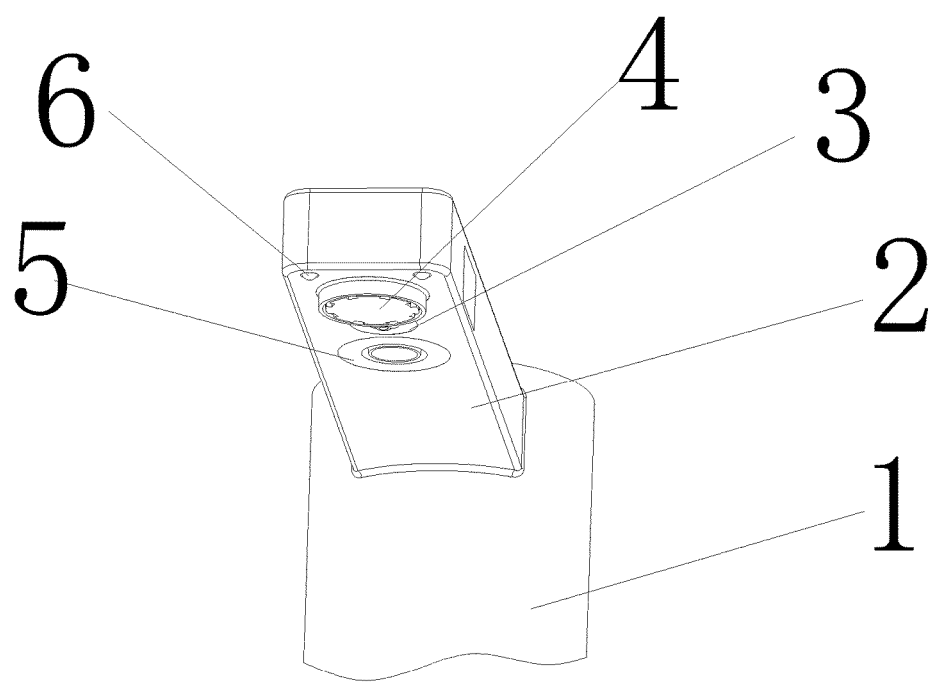
FIG. 2 is a partially enlarged view of the faucet in FIG. 1.

With reference to FIGS. 1 and 2, a first embodiment of a faucet with sensing activation for blow-drying and discharge of water and liquid soap in accordance with the present invention includes a main body 1 and an outlet arm 2.

The main body 1 includes a water hose, an air hose and a soap hose therein respectively connected to an external water inlet pipe, an external soap inlet pipe and an external air inlet pipe.

The outlet arm 2 is rotatably mounted on and extends outwards from the main body 1 and has a front end, a soap outlet 3, a water outlet 4, an air outlet 5 and multiple sensors 6 mounted on the front end of the outlet arm 2. The multiple sensors 6 serve to sense the presence of nearby objects for outputting soap, water and air through the soap outlet 3, the water outlet 4 and the air outlet 5.

Figure 3:
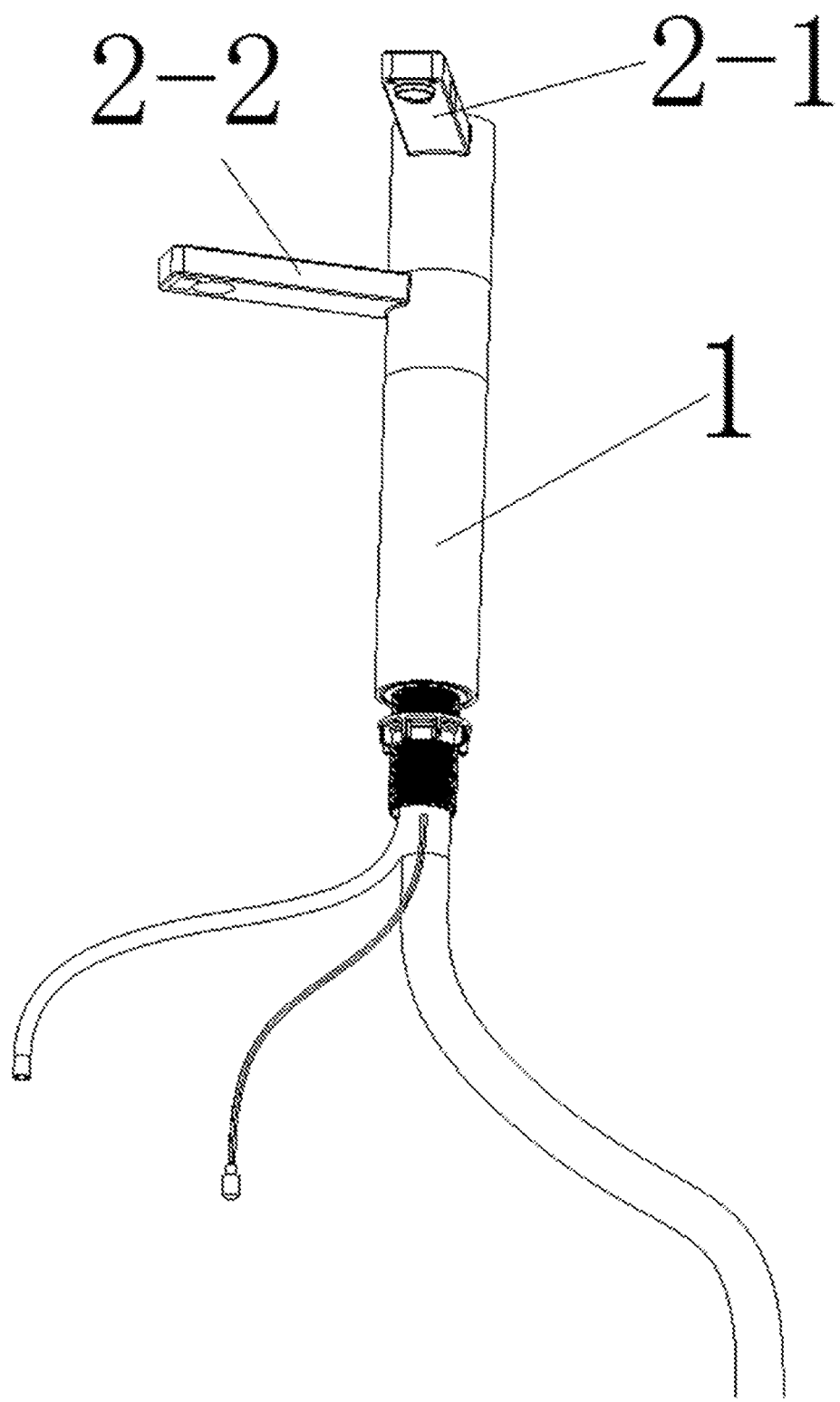
FIG. 3 is a perspective view of a second embodiment of a faucet with sensing activation for blow-drying and discharge of water and liquid soap in accordance with the present invention.
Figure 4:
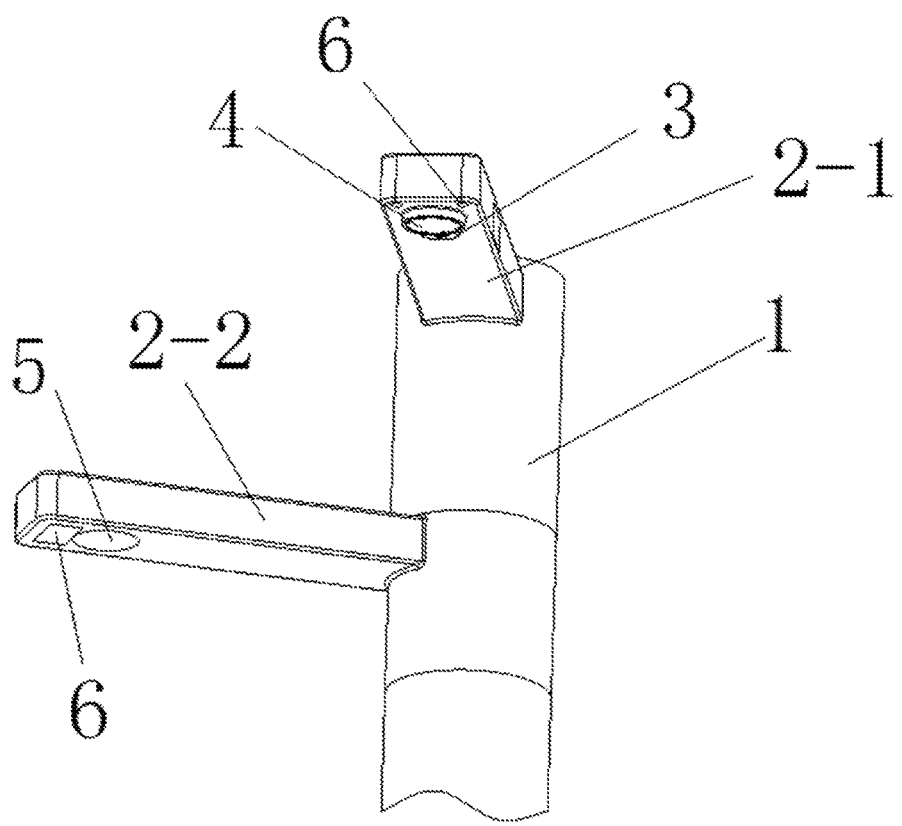
FIG. 4 is a partially enlarged view of the faucet in FIG. 3.

With reference to FIGS. 3 and 4, a second embodiment of a faucet with sensing activation for blow-drying and discharge of water and liquid soap in accordance with the present invention differs from the first embodiment in that the faucet has a first outlet arm 2-1 and a second outlet arm 2-2 rotatably mounted on and extending outwards from the main body 1. Two of the soap outlet 3, the water outlet 4 and the air outlet 5 are formed on a bottom surface of the first outlet arm 2-1, and the remaining one is formed on a bottom surface of the second outlet arm 2-2. For example, the soap outlet 3 and the water outlet 4 is formed on the bottom surface of the first outlet arm 2-1 and the air outlet 5 is formed on the bottom surface of the second outlet arm 2-2, the water outlet 4 and the air outlet 5 is formed on the bottom surface of the first outlet arm 2-1 and the soap outlet 3 is formed on the bottom surface of the second outlet arm 2-2, or the air outlet 5 and the soap outlet 4 is formed on the bottom surface of the first outlet arm 2-1 and the water outlet 4 is formed on the bottom surface of the second outlet arm 2-2.

Figure 5:
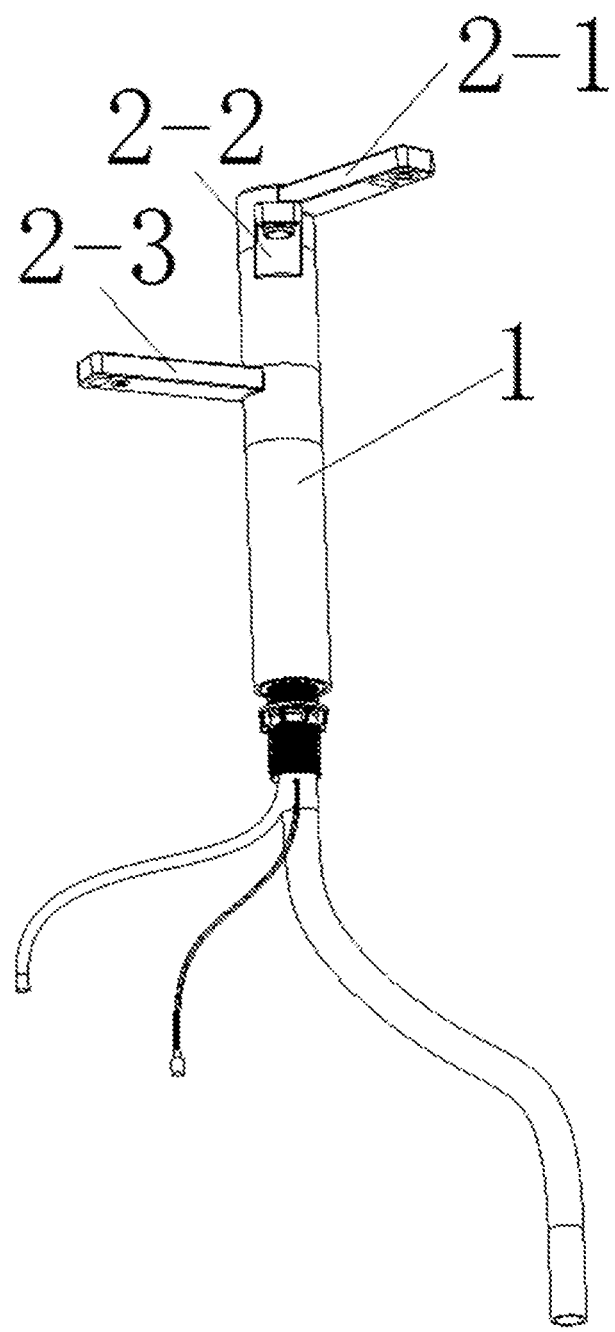
FIG. 5 is a perspective view of a third embodiment of a faucet with sensing activation for blow-drying and discharge of water and liquid soap in accordance with the present invention.
Figure 6:
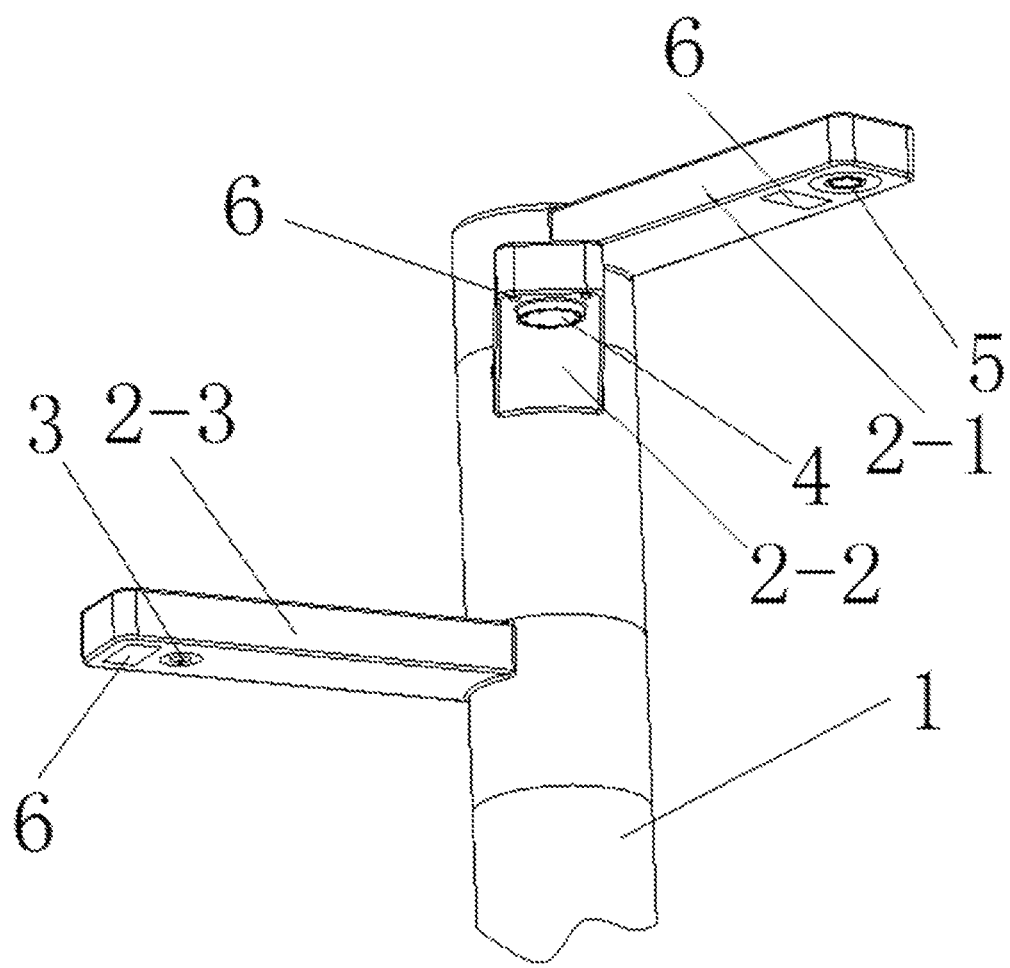
FIG. 6 is a partially enlarged view of the faucet in FIG. 5.

With reference to FIGS. 5 and 6, a third embodiment of a faucet with sensing activation for blow-drying and discharge of water and liquid soap in accordance with the present invention differs from the first embodiment in that the faucet has a first outlet arm 2-1, a second outlet arm 2-2 and a third outlet arm 2-3 rotatably mounted on and extends outwards from the main body 1. The soap outlet 3, the water outlet 4 and the air outlet 5 are respectively formed on bottom surfaces of the first outlet arm 2-1, the second outlet arm 2-2 and the third outlet arm 2-3.

To facilitate operation demand, the outlet arm 2, the first outlet arm 2-1, the second outlet arm 2-2, and the third outlet arm 2-3 are adjustably rotatable with respect to the main body 1 for the soap outlet 3, the water outlet 4 and the air outlet to be optimally positioned in operation.

The multiple sensors 6 are photoelectric sensors electrically connected with multiple controllers for controlling outputs of the soap outlet 3, the water outlet 4 and the air outlet 5. The multiple sensors 6 may be mounted on the bottom surface(s) of one or a combination of the outlet arm 2, the first outlet arm 2-1, the second outlet arm 2-2, and the third outlet arm 2-3, and may be respectively located beside the soap outlet 3, the water outlet 4 and the air outlet 5. Alternatively, the sensors 6 may be mounted on a left side, a right side, a front portion or a back portion of the main body 1. Whenever approaching any one of the soap outlet 3, the water outlet 4 and the air outlet 5, a user's hand can be detected by a corresponding sensor 6, the sensor 6 having a first single transfer to one of the controllers connected to the corresponding sensor 6, and the controllers to receive the first single transfer a second single to output liquid soap, water or air through the approached one of the soap outlet 3, the water outlet 4 and the air outlet 5. The sensors 6 automatically turn on the controllers of the soap outlet 3, the water outlet 4 and the air outlet 5 to permit soap, water and air to flow out of the soap outlet 3, the water outlet 4 and the air outlet 5 respectively.

The main body 1 may be perpendicular to a mounting surface of a sink or not, and the main body 1 may be any shape without limitation. Each one of the outlet arm 2, the first outlet arm 2-1, the second outlet arm 2-2 and the third outlet arm 2-3 may be perpendiculars to the main body 1 or not, and a junction between the main body 1 and each one of the outlet arm 2, the first outlet arm 2-1, the second outlet arm 2-2 and the third outlet arm 2-3 may be a curved surface.

As discharge of water and liquid and blow drying can be all equipped on a faucet of the present invention, the space required for mounting the faucet, mounting holes through the sink and assembly works can be reduced.

What is claimed is:

1. A faucet with sensing activation for blow-drying and discharge of water and liquid, comprising:
   a main body; and
   at least one outlet arm mounted on and extending outwards from the main body, and having a soap outlet, a water outlet, an air outlet and multiple sensors respectively mounted on the at least one outlet arm, wherein when an external object approaches one of the soap outlet, the water outlet and the air outlet, the external object is detected by a corresponding sensor for activating one of blow-drying, discharge of water and discharge of liquid soap through a corresponding one of the soap outlet, the water outlet and the air outlet.

2. The faucet as claimed in claim 1, wherein a quantity of the at least one outlet arm is one, the water outlet, the soap outlet, and the air outlet are mounted on the outlet arm.

3. The faucet as claimed in claim 1, wherein the at least one outlet arm includes a first outlet arm and a second outlet arm, two of the soap outlet, the water outlet and the air outlet are mounted on the first outlet arm, and the remaining one is mounted on the second outlet arm.

4. The faucet as claimed in claim 1, wherein the at least one outlet arm includes a first outlet arm, a second outlet arm and a third outlet arm, and the soap outlet, the water outlet and the air outlet respectively mounted on the first outlet arm, the second outlet arm and the third outlet arm.

5. The faucet as claimed in claim 1, wherein the at least one outlet arm is rotatably mounted on the main body.

6. The faucet as claimed in claim 2, wherein the at least one outlet arm is rotatably mounted on the main body.

7. The faucet as claimed in claim 3, wherein the at least one outlet arm is rotatably mounted on the main body.

8. The faucet as claimed in claim 4, wherein the at least one outlet arm is rotatably mounted on the main body.

9. The faucet as claimed in claim 1, wherein the multiple sensors are photoelectric sensors and are electrically connected with multiple controllers for respectively controlling the soap outlet, the water outlet and the air outlet to discharge liquid soap and water and blow air.

10. The faucet as claimed in claim 1, wherein the multiple sensors are mounted beside the soap outlet, the water outlet and the air outlet.

* * * * *